United States Patent [19]

Davidson et al.

[11] 4,382,270

[45] May 3, 1983

[54] GROUND FAULT CIRCUIT BREAKER WITH MECHANICAL INDICATOR FOR GROUND FAULT TRIPS

[75] Inventors: Ronnie D. Davidson, Bridgeport; Bruce S. Preston, Stratford, both of Conn.

[73] Assignee: Westinghouse Electric Corp., Pittsburgh, Pa.

[21] Appl. No.: 251,792

[22] Filed: Apr. 7, 1981

[51] Int. Cl.[3] ...................... H02H 3/347; H01H 83/02

[52] U.S. Cl. ...................................... 361/115; 335/17; 335/18; 361/45; 340/644; 340/664; 340/650

[58] Field of Search ..................... 361/44, 45, 46, 115, 361/100, 93–98; 340/635, 644, 651, 654, 664, 340/650; 335/18, 17

[56] References Cited

U.S. PATENT DOCUMENTS

| | | | |
|---|---|---|---|
| 3,614,533 | 10/1971 | Douglas et al. | 361/44 |
| 3,893,052 | 7/1975 | Kotos et al. | 335/229 |
| 3,943,409 | 3/1976 | Brown | 361/44 |
| 4,004,201 | 1/1977 | DePuy | 361/96 |
| 4,037,185 | 7/1977 | Klein | 361/115 X |
| 4,068,283 | 1/1978 | Russell | 361/96 X |
| 4,081,852 | 3/1978 | Coley et al. | 361/45 |
| 4,223,365 | 9/1980 | Moran | 361/96 X |
| 4,250,532 | 2/1981 | Davis | 361/96 |

*Primary Examiner*—Patrick R. Salce
*Attorney, Agent, or Firm*—G. H. Telfer

[57] ABSTRACT

A ground fault circuit breaker including ground fault interruption means and overload interruption means that are independently responsive to open a common set of breaker contacts upon respective ground fault and overload conditions is provided with a trip indicator visible external to the breaker that operates on actuation of the ground fault interruption means but not upon operation of the overload interruption means, the trip indicator being a mechanical device that is actuated upon the movement of the solenoid plunger that operates upon occurrence of a ground fault condition.

2 Claims, 5 Drawing Figures

GROUND FAULT CIRCUIT BREAKER WITH MECHANICAL INDICATOR FOR GROUND FAULT TRIPS

BACKGROUND AND SUMMARY OF THE INVENTION

This invention relates to circuit breakers with ground fault interruption capability with a visual indicator of a ground fault trip that differentiates from an overload trip.

Ground fault circuit breakers are known in which the elements of a circuit breaker as normally devised for overload current protection are combined with the elements of a ground fault circuit interrupter and packaged together for a location at a load center. A representative example is that of Coley et al. U.S. Pat. No. 4,081,852, Mar. 28, 1978, which is incorporated by reference herein and describes an arrangement including a ground fault detector in side-by-side relation with a circuit breaker with interconnection therebetween so that breaker contacts are tripped open upon the occurrence of either a current overload condition or a ground fault condition.

Ground fault circuit breakers normally have an external handle for manual switching and trip indication. The handle has ON, OFF, and TRIP positions so that upon examination a user can tell if the breaker has tripped. Such apparatus has been widely and successfully used. It is the case, however, that a trip of the breaker is indicated in the same manner by the handle regardless of the cause of the trip, whether it be an overload condition or a ground fault condition.

There is interest in providing a ground fault circuit breaker with an indicator that shows the user if a trip is due to a ground fault condition, rather than an overload, so that any system condition causing a trip can be more readily identified and corrected. A ground fault circuit breaker with a ground fault trip indicator, that is not responsive to overload trips, is disclosed in copending application Ser. No. 175,976, filed Aug. 7, 1980, by R. Davidson and J. Misencik which is herein incorporated by reference and describes an arrangement in which an additional circuit branch in the ground fault interrupter portion of the ground fault circuit breaker is energized to turn on an indicating light or the like upon the occurrence only of a ground fault trip. The arrangement of the copending application is effective but because of the electrical components required entails additional cost that is desired to be avoided.

In accordance with the present invention, a ground fault trip in a ground fault circuit breaker is indicated by a mechanical arrangement operable without additional electrical components to those existing in the ground fault circuit breaker. The arrangement utilizes the motion of the trip solenoid that occurs upon a ground fault trip to open the breaker contacts. The general idea is for the solenoid's plunger movement to release a spring loaded mechanical element that then extends from the breaker unit indicating a ground fault trip. More specifically, the mechanical element may be a button that is in a normally depressed location from the exterior of the unit. Attached to the button is a spring biasing it outwardly and a latch which holds the button in the depressed location in the absence of a trip. A latch arm is located so that it is subject to unlatching when a means for actuating opening of the breaker contacts is moved by the inward motion of the solenoid plunger. After the breaker is reset to ON, the ground fault indicating button can be depressed and relatched.

In this way, the desired ground fault indicating function, with the ability to differentiate a ground fault trip from other trips, is achieved merely by the addition of the indicating button and its spring and latch assembly. The electrical arrangement of the circuit breaker remains unchanged and the mechanical elements required are economical to implement.

DESCRIPTION OF THE PREFERRED EMBODIMENTS

Figure 1:
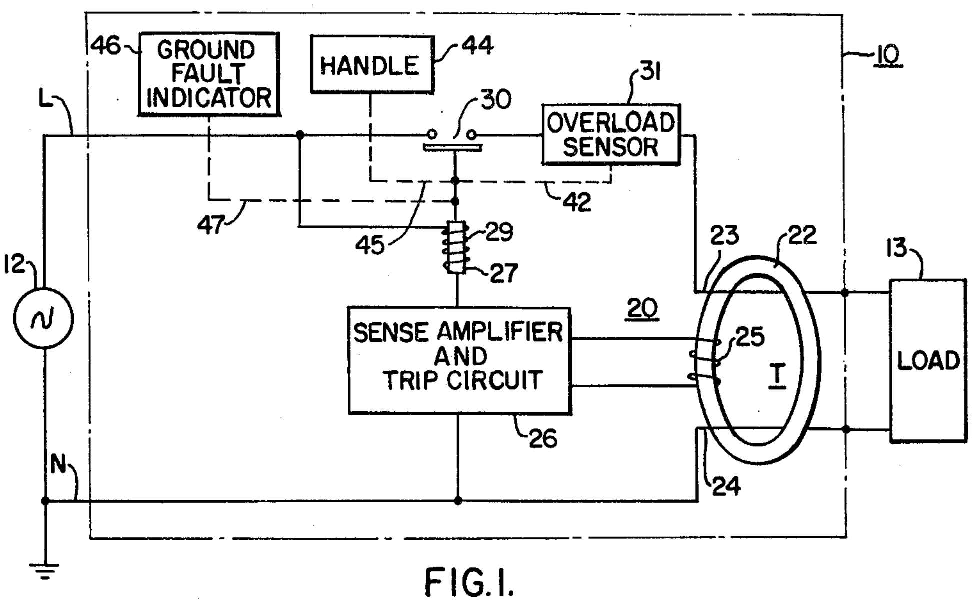
FIG. 1 is a schematic diagram of a ground fault circuit breaker in accordance with the present invention.

Referring to the drawings, FIG. 1 shows a ground fault circuit breaker 10 associated with an AC electrical distribution system between a supply 12 and a load 13. The system illustrated is a common single-phase, two wire system including line and neutral conductors L and n with the neutral grounded proximate the supply 12. However, it will be understood the invention applies as well to breakers of greater complexity for systems having three or more wires and two or more phases.

Ground fault detection means 20 is provided which includes a differential current transformer T including a magnetic core 22 with primary windings 23 and 24, each arranged for connection with respective ones of the conductors L and N of the AC distribution system, and a secondary sensing winding 25 on the core for sensing current imbalance between the primary windings. Sensed signals on the sensing winding 25 are provided to an electronic package 26 that normally includes an amplifier and a solid state switching device. An example of such circuitry may be found in Engel et al. Ser. Pat. No. 3,852,642, Dec. 3, 1974, which is herein incorporated by reference and the circuitry of that portion of the apparatus will not be fully detailed herein. The unit 26, referred to as a sense amplifier and trip circuit, amplifies the signal from the sensing winding 25 and may provide other functions such as time delay and signal integration before achieving a trip signal of predetermined magnitude that is sufficient to turn on the solid state switch therein, commonly an SCR. The unit 26 is connected with a solenoid trip coil 29 in a branch between the system conductors L and N so that the trip coil is energized when circuit 26 produces a trip signal to result in opening a set of breaker contacts 30 through a mechanical linkage 40.

In addition, the breaker 10 includes an overload sensor 31 for sensing current overloads on the line conductor L. Overload sensor may be a known type of thermal/magnetic device that also results in opening the breaker contacts 30 through a mechanical linkage 42 that joins at point 43 with solenoid linkage 40 so they together serve to open the breaker contacts upon the occurrence of either a ground fault or a current overload.

It should be understood in this description that the ground fault interruption means 20 is responsive to conditions other than a ground fault from the line conductor L. For example, grounded neutral protection means, not illustrated, which may be in accordance with known practice, is normally included. What is referred to herein as a ground fault condition is any condition which results in the operation of the ground fault interruption means 20, circuit 26 and solenoid 27.

Mechanically related to the elements 40 and 42 for opening the breaker contacts 30 are a handle mechanism 44 and a ground fault indicator 46. The handle mechanism is as has been employed in prior practice such as described in U.S. Pat. No. 4,081,852. Handle 44 extends externally from the case of the breaker and permits operation through mechanical linkage 45 of the breaker contacts 30. Movement of the handle 44 upon a trip by either cause, an overload or a ground fault, indicates the status of the breaker.

The ground fault indicator 46 which is introduced by this invention is mechanically related through linkage 47 to only the plunger of the solenoid 27 with which the trip coil 29 is related. Upon motion of the plunger when a trip occurs, the ground fault indicator is actuated so that it is revealed on the exterior of the breaker. A trip due to actuation of the overload sensor 31 does not result in operation of the ground fault indicator 46.

The mechanical elements 40, 42, 45 and 47 that are only schematically illustrated in FIG. 1 will be better understood by reference to the following description in conjunction with the description of U.S. Pat. No. 4,081,852 which shows and describes those elements for actuation of the breaker contacts in response to either ground faults or other faults. The additional components related to the ground fault indicator will be particularly described hereinafter.

Figure 2:
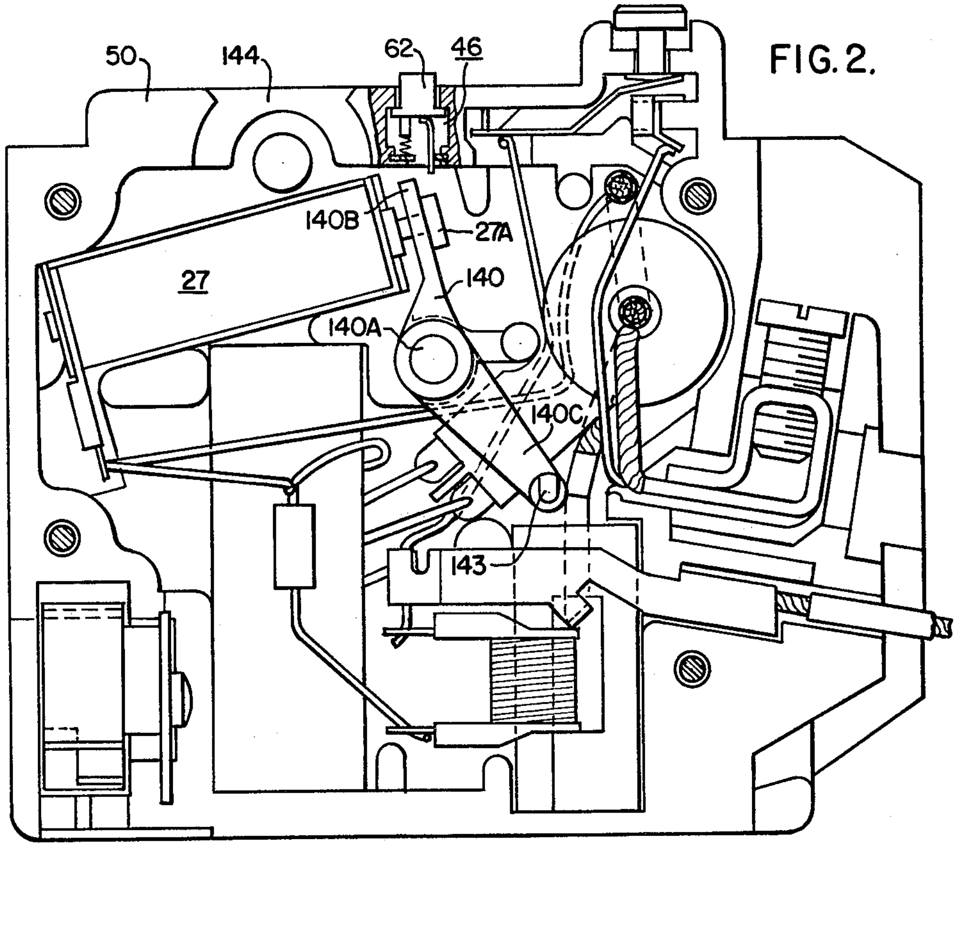
FIG. 2 is a vertical sectional view of the ground fault interrupter portion of a ground fault circuit breaker in accordance with this invention.
Figure 4:
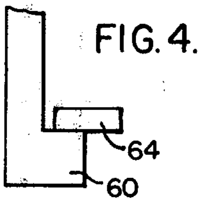

Referring to FIG. 2, this view is a vertical sectional view of the ground fault interrupter side of a ground fault circuit breaker as made in accordance with U.S. Pat. No. 4,081,852 with the additional features that involve the present invention. Most of the various elements shown in FIG. 2 are pictorially the same as those presented in FIG. 4 of the referred to patent and will not be described in detail herein. The purpose of this illustration is to set the context within a formerly known apparatus in which additional elements for ground fault trip indication can be provided in accordance with an embodiment of the present invention. Briefly, what is illustrated is within a housing 50 of normal molded configuration having recesses for the accommodation of components therein. The components include the trip solenoid 27 with its plunger 27A extending from its end. A tripper cam 140, mounted on pivot 140A, has an end 140B that is positioned on and moves with the motion of the plunger 27A. The other end 140C of the tripper cam 140 is associated through a pin 143 to the thermal/magnetic trip elements, not shown, of the breaker. Also, the position of a handle that is both an operating handle and a trip indicating handle is shown at 144 in FIG. 2, however the mechanism relating to it is also that shown in the patent and not illustrated herein.

Figure 3:
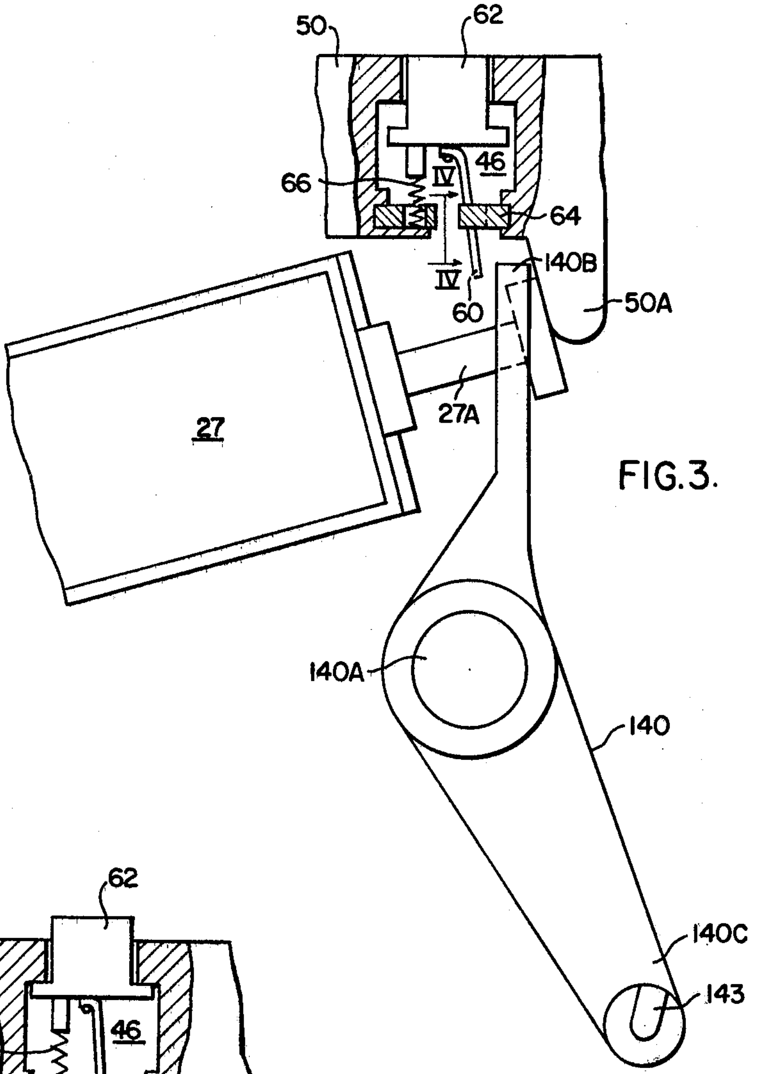
FIG. 3 is an enlarged view of a portion of the apparatus of FIG. 2 showing the ground fault indicator in the latched position; and, FIG. 4 is a view taken along lines IV—IV of FIG. 3.
Figure 5:
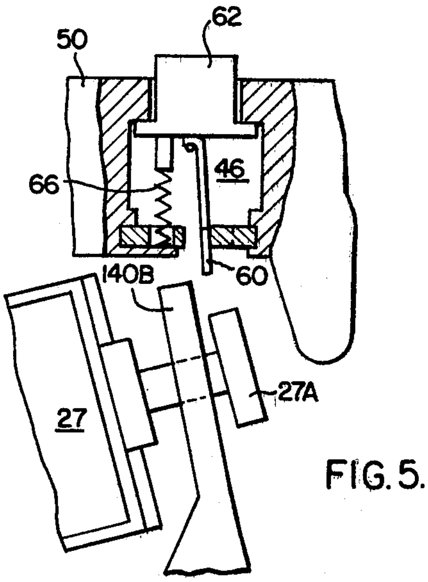
FIG. 5 is an enlarged view of a portion of the apparatus of FIG. 2 showing the ground fault indicator in its tripped position.

A ground fault indicator 46, to be more fully described in connection with FIGS. 3 and 5, is disposed within the housing wall 50 proximate the end **140*b* of the tripper cam 140**.

The elements shown are examples of those suitable for use in the practice of the invention. The tripper cam 140, for example, could be replaced by other mechanical means that moves in response to a ground fault signal (upon actuation of solenoid 27) to effect opening of the breaker contacts (through pin 143).

The solenoid plunger 27A is related to the ground fault indicator 46 in a manner as shown in FIGS. 3 and 5. In FIG. 3 is sown an enlarged view of the elements in the latched position, when the breaker is ON. The housing wall 50 adjacent the solenoid 27 is modified to accommodate the ground fault indicator 46. The solenoid plunger 27A is fully extended and may bear against a bulge of plastic molding 50A forming part of the housing wall. The tripper cam 140 is in the position in which the breaker contacts located elsewhere in the unit are in their closed position. The end 140B of the tripper cam on the plunger 27A is on the right of a latch arm 60 of the ground fault indicator with a small clearance therebetween. A ground fault indicator button 62 is in its recessed position as shown because the latch arm 60 is held under a stop 64 in the configuration of the molded housing wall (see FIG. 4). Also shown is a spring 66 associated with the indicator button 62 which biases it outwardly. In FIG. 3 the spring 66 is in its compressed condition because the button is held in by the latch.

In FIG. 5 the elements are shown in the tripped position. The solenoid plunger 27A has moved into the solenoid body resulting in movement of the tripper cam 140 counterclockwise about its pivot 140A. By this motion cam arm 140A swings by and releases the latch 60 on the indicator button 62 so that the button is forced by spring 66 outwardly thus indicating the operation of the solenoid and hence a ground fault trip. (In an alternative form of the invention, the movement of the button's latch means (60 in this example) could be effected by the solenoid plunger 27A directly rather than through another element such as 140B.)

In the position shown in FIG. 5, the latch 60 is out of the way so that, upon resetting of the breaker such as by operation of the handle, the tripper cam 140 can swing back without interference with the latch. Then the indicator button can be depressed and relatched in the position shown in FIG. 3, or an additional mechanical linkage, not shown, could be used to effect an automatic resetting of the button upon the clockwise movement of arm 140B.

There has thus been presented a simple to implement yet effective means for indicating a ground fault trip of a ground fault circuit breaker, that is not actuated upon the occurrence of an overload trip. It may be practiced without extensive change from prior arrangements employed in ground fault circuit breakers. However the invention may be practiced in specific forms in addition to those specifically described and illustrated herein.

I claim:

1. A ground fault circuit breaker, with a trip indicator for ground fault trips that is not actuated by overload trips, comprising:

a differential current transformer including a magnetic core, a plurality of primary windings on said core, each being arranged for connection with respective ones of the conductors of an AC electrical distribution system between a supply and a load, and a secondary sensing winding on said core for sensing current imbalance between said primary windings;

breaker contacts, operated by a trip mechanism, in series with at least one of said system conductors;

first means for actuating said trip mechanism upon occurrence of a predetermined sensed signal on said sensing winding comprising a solenoid having a plunger;

second means for actuating said trip mechanism upon occurrence of an overload through said at least one of the system conductors;

ground fault trip indication means for indicating a trip due to operation of said first means for actuating said trip mechanism and not to operation of said second means for actuating said trip mechanism comprising a button that is spring loaded and recessed within the breaker housing and is normally held in a latched position by latching means, said plunger of said first means for actuating said trip mechanism being arranged to result in releasing said latching means upon movement of said plunger as a result of a ground fault condition.

2. A ground circuit breaker in accordance with claim 1 wherein:

said first means for actuating said trip mechanism further comprises a tripper cam having a pivot mounting and a first extremity located on and movable with said plunger and a second extremity mechanically coupled to said trip mechanism; and, said latching means is positioned to be moved and released from its latched position when said tripper cam first extremity is moved by motion of said solenoid plunger resulting in release of said button to an outward position indicating a ground fault trip.

* * * * *